UNITED STATES PATENT OFFICE.

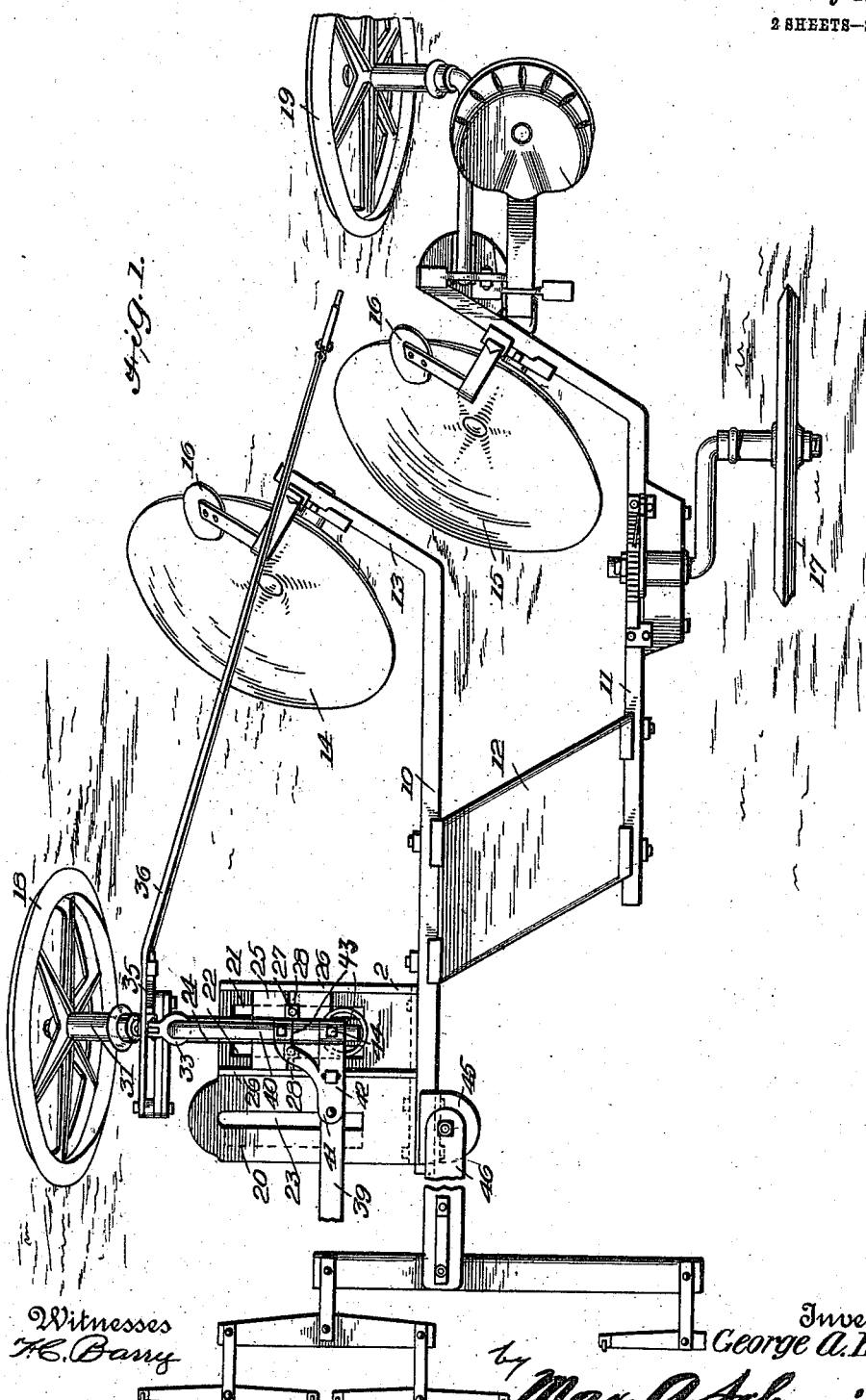

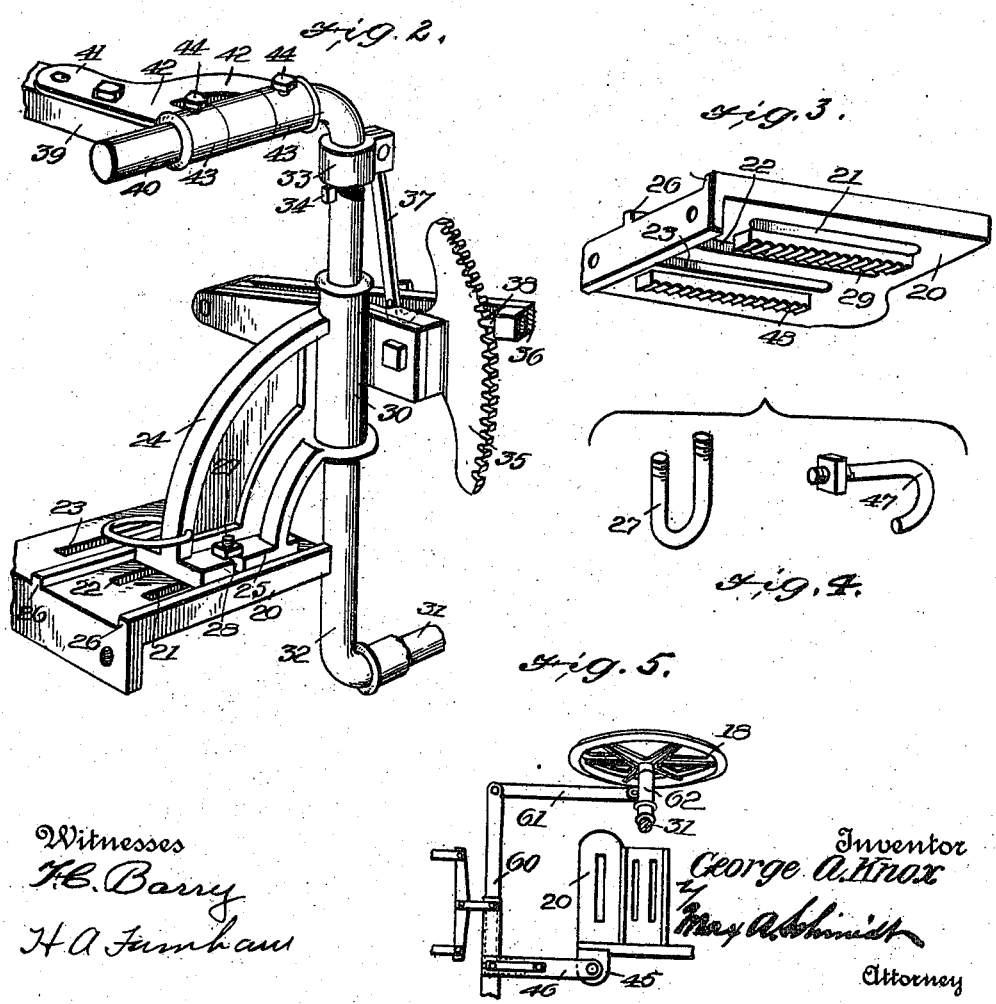

GEORGE A. KNOX, OF DEXTER, NEW YORK.

PLOW.

963,901.　　　　　Specification of Letters Patent.　　Patented July 12, 1910.

Application filed August 12, 1909. Serial No. 512,539.

*To all whom it may concern:*

Be it known that I, GEORGE A. KNOX, a citizen of the United States, residing at Dexter, in the county of Jefferson and State of New York, have invented certain new and useful Improvements in Plows, of which the following is a specification.

The object of the present invention is to provide in a disk plow improved means for supporting the front furrow wheel, and for raising and lowering the main frame relatively to the said wheel, as well as means for holding the frame in adjusted position.

Another object is to provide improved means for adjusting the front furrow wheel and the draft devices to furrows of different widths.

With these objects in view, the invention consists in a novel construction and arrangement of parts to be hereinafter described and claimed, reference being had to the drawings hereto annexed, in which—

Figure 1 is a plan view of the implement. Fig. 2 is a perspective view of the front furrow wheel supporting means. Fig. 3 is a perspective view of a portion of such supporting means. Fig. 4 shows the fastening means hereinafter referred to. Fig. 5 is a fragmentary plan view showing a modification.

Referring more particularly to the drawings, the main frame of the implement comprises beams 10 and 11, which are rigidly secured together, and held in spaced relation by a spacing block 12. The beam 10 has at its rear end a laterally directed portion 13 which carries one of the disks 14, and the beam 11 has at its rear end a similar laterally directed portion extending parallel to the portion 13, and carrying the other disk 15. Suitable bearings are provided for the axles of the disks, and each disk is provided with a scraper 16.

The main frame is supported by a land wheel 17, and front and rear furrow wheels 18 and 19, respectively. Suitable means, coöperating with the land wheel support, are provided for raising or lowering the main frame relatively to said wheel, and as such means are well known, and form no part of the present invention, a detailed description thereof is thought unnecessary.

To the front end of the beam 10 is securely bolted, or otherwise fastened a casting in the shape of a plate 20 having a series of parallel slots indicated respectively at 21, 22 and 23. On this plate is mounted an arched member 24 carrying the axle of the front furrow wheel, and having a base 25 which engages the top of the plate, and fits between parallel ribs 26 formed thereon. The arched member is securely held in place on the plate by a U-bolt 27, the shanks of which pass through the slots 21 and 22, and through notches 28 made in opposite edges of the base 25. The shanks of the bolt project a suitable distance above the base, and on the projecting ends are screwed nuts, which upon being tightened up, securely fasten the arched member to the plate 20. On the bottom of the plate is a notched rib 29 which is engageable by the bend of the bolt, and which assists to hold said bolt in place.

The slots 21 and 22 extend transversely of the implement in order that the arched member 24 may be adjusted on the plate 20, the adjustment being laterally with respect to the main frame. This adjustment of the arched member is provided in order that the front furrow wheel 18 may be set to furrows of different widths.

The means for raising and lowering the main frame relatively to the front furrow wheel, and for holding the frame in adjusted position, comprise the following instrumentalities: The outer end of the arched member 24 is formed with a vertically disposed tubular portion 30 which forms a bearing. The axle 31 of the front furrow wheel is formed with a vertical spindle 32 which is journaled in the bearing 30, whereby a pivotal support for the axle is had, and the furrow wheel is therefore free to swing in the direction of the main frame, to facilitate the turning of the implement.

The spindle 32 rises a suitable distance from the bearing 30, and is loosely encircled above the same by a sleeve 33. A key 34 passing transversely through the spindle below the sleeve, prevents the latter from slipping down on the spindle. To the arched member is fastened a segment rack 35, to which is fulcrumed, at one of its ends, a hand lever 36, which is operatively connected by a link 37 to the sleeve 33. The lever carries a spring latch 38 which engages the teeth of the rack for holding or locking the lever at adjustment.

The main frame is raised or lowered with respect to the front furrow wheel by means of the hand lever 36, and upon locking the same, the frame is securely held in adjusted position. The sleeve 33 does not grip the spindle 32, and the latter is therefore free to swing in the bearing 30 as already described.

At 39 is indicated a draft tongue which is rigidly secured to a lateral bend 40 made in the upper end of the spindle 32, so that when the implement is at work, the front furrow wheel is held in line; and when a turn is made, said wheel swings around with the tongue, thereby facilitating the turning movement of the implement.

The tongue 39 is secured to the bend 40 by a casting 41 which is rigidly secured to the tongue, and has a pair of spaced arms 42 formed at their outer ends with sleeves 43 in which the bend 40 is received. Set screws 44 passing through the sleeves, securely fasten the casting to the bend. This method of attaching the casting to the bend, permits adjustment thereon.

To the front end of the beam 10 is bolted a bracket 45, to which the draft plate 46 is connected for a three-horse hitch. For a two or four-horse hitch, the draft plate is removed from the bracket, and connected to the plate 20 by means of a hook-shaped bolt 47 which is passed through the slot 23, the hook portion of the bolt engaging a notched rib 48 on the bottom of the plate, whereby a more secure hold is had. The slot 23 extends transversely of the main frame, and it is provided in order that the draft may be adjusted to the width of the furrow.

In Fig. 5 is shown a modification of the connection between the draft devices and the axle of the front furrow wheel, which permits the tongue to be dispensed with. The draft plate 46 is mounted as before, and has connected to its outer end, one end of a link 60. The other end of this link is connected to an arm 61, secured to, and projecting forwardly from a sleeve 62, which is mounted on that portion of the axle 31 which extends laterally from the main frame. When the team is making a turn, the draft plate swings, and through the connection described, the axle is caused to swing in its bearing 30, thus swinging the front furrow wheel around as before.

In the drawings I have shown the invention applied to a gang disk plow, but it is to be understood that it may be applied to single disk plows with equal facility, and furthermore, various minor changes in the structural details may be resorted to without a departure from the invention.

I claim:

1. In a plow, a frame, a plate carried at the front end thereof, and having slots extending laterally of the frame, a furrow wheel support mounted on the plate, and having its base notched on opposite sides, a U-bolt having its shanks passing through the slots of the plate and through the notches of the support, and nuts screwed on said shanks, and engageable with the base of the support.

2. In a plow, a frame, a slotted plate carried at the front end thereof, the slots extending laterally of the frame, and a furrow wheel support mounted adjustably on the plate, the fastening means for said member passing through certain of the slots, the other slot being provided for attachment of laterally adjustable draft devices.

In testimony whereof I affix my signature in presence of two witnesses.

GEORGE A. KNOX.

Witnesses:
 Fre'd. E. Wood,
 O. M. Wood.